W. & R. FOSTER.
TAP FOR CUTTING SCREWS.
No. 26,487. Patented Dec. 20, 1859.
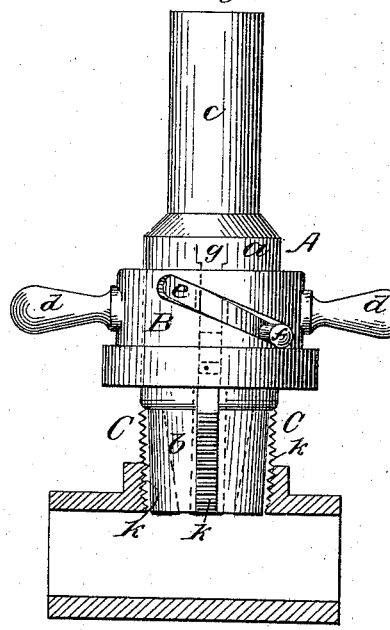
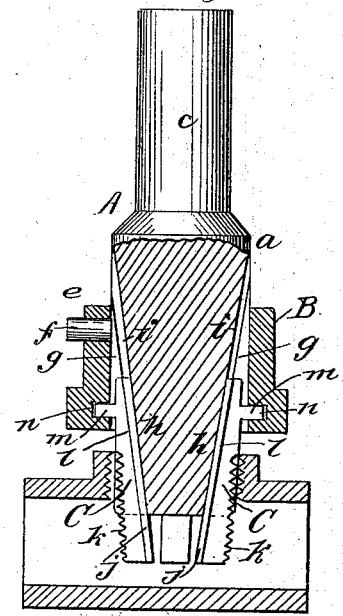
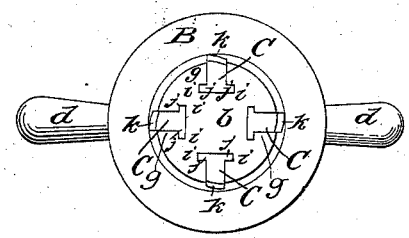
Witnesses,
Thos Bennett
John Broughton
Inventors,
William Foster
Robert Foster

UNITED STATES PATENT OFFICE.

WILLIAM FOSTER AND ROBERT FOSTER, OF NEW YORK, N. Y.

SCREW-TAP.

Specification of Letters Patent No. 26,487, dated December 20, 1859.

*To all whom it may concern:*

Be it known that we, WILLIAM FOSTER and ROBERT FOSTER, both of the city, county, and State of New York, have invented a new and Improved Tap for Cutting Screws; and we do hereby declare that the following is a full, clear, and exact description of the same, reference being had to the annexed drawings, making a part of this specification, in which—

Figure 1, is an external view of our invention. Fig. 2, is a side sectional view of the same. Fig. 3, is an inverted plan of the same.

Similar letters of reference indicate corresponding parts in the several figures.

The object of this invention is to expedite the withdrawal of the tap from its work after the latter has been performed, so as to save the time hitherto lost by the slow reverse withdrawal movement of the tap in the screw cut by it, and consequently obviate the necessity for the reversing gear hitherto necessarily employed in order to withdraw the tap.

To enable those skilled in the art to fully understand and construct our invention we will proceed to describe it.

A, is the stock of the tap which is formed of a cylindrical portion $a$, and a conical portion $b$, the former being attached to a rotating arbor $c$. The stock is formed of steel and on the cylindrical portion $a$, thereof a collar B, is fitted and allowed to turn freely, said collar being provided with a handle $d$, at two opposite points of its periphery. The collar B, is provided with two oblique slots $e$, $e$, which have reverse positions relatively with each other and in which the ends of a pin $f$, fit, said pin passing transversely through the cylindrical part $a$, of the stock. In the conical portion $b$, as well as in the cylindrical portion $a$, of the stock A, grooves $g$, are made longitudinally and at equal distances apart. These grooves have inclined backs $h$, as shown clearly in Fig. 2, and each groove has a lateral recess $i$, at each side of it and extending its whole length. In the grooves $b$, cutters C, are placed and allowed to slide freely. These cutters C, are formed of steel bars having their back edges made oblique or taper corresponding to the inclination of the backs of the grooves $g$, and each bar has a lateral projecting strip $j$, at each side which strips fit in the recesses $i$, of the grooves $g$, and form a dovetail, as shown clearly in Fig. 3. The outer surface of each bar is cut transversely forming the section of a screw, as shown at $k$, and corresponding to the thread of the female screw to be cut, one edge of each bar being a little more prominent than the other in order to form cutters. The parts of the bars over which the collar B, works are smooth as shown at $l$, and each smooth part $l$, is provided with a projection $m$, which fits into a groove $n$, in the inner side of the collar B, as shown in Fig. 2.

The operation is as follows: The arbor $c$, is rotated from left to right and the tap is applied to its work as usual, see Figs. 1 and 2, the cutters C as they rotate in the hole cutting the screw, the cutters feeding themselves to their work precisely the same as those of an ordinary tap. When the tap is at work, the cutters C, have their outer ends flush with the end of the conical part $b$, of the stock and the cutting parts R, of the cutters project sufficiently from the conical portion $b$, of the head, so that they may perform their work. When the work is completed, that is to say, the screw cut, the operator or attendant grasps one or both of the handles $d$, of the collar B, and arrests its rotation and the arbor $i$, still moving, will cause the cutters C, to be forced outward, as shown in Fig. 2, and owing to the inclined backs $h$, of the grooves $g$, and corresponding form of the backs of the cutters, the latter will be drawn inward toward each other as they are forced outward and the cutters will consequently be free from their work, that is, the screw cut by them, and the tap may be immediately withdrawn.

Taps constructed in the usual way require, each time a screw is cut, to have their motion reversed in order that they may be withdrawn from them. The withdrawal therefore of the taps consumes as much time as is required to cut the screws, and it also involves the necessity of a reversing gear connected with the arbor so that its motion may be reversed to effect the withdrawal of the tap. By our invention this reversing gear is dispensed with and the direct attachment of a weight to the arbor is permitted so that the tap may be automatically withdrawn as soon as the cutters C, are released from their work.

Having thus described our invention, we claim as new and desire to secure by Letters Patent—

The combination of the oblique backed taps C, and slotted collar B, with the tapering or conical stock A, substantially as shown and described, so that on turning the collar the cutting threads of the taps will be released from the nut and thus allow the tool to be withdrawn, all as specified.

WILLIAM FOSTER.
ROBERT FOSTER.

Witnesses:
THOS. BENNETT,
JOHN BROUGHTON.